(12) United States Patent
Pastor

(10) Patent No.: US 11,554,840 B2
(45) Date of Patent: Jan. 17, 2023

(54) BUOYANT CAMERA DEVICE AND METHOD

(71) Applicant: FUGRO N.V., Leidschendam (NL)

(72) Inventor: Chad Pastor, Lafayette, LA (US)

(73) Assignee: Fugro N.V., Leidschendam (NL)

( * ) Notice: Subject to any disclaimer, the term of this patent is extended or adjusted under 35 U.S.C. 154(b) by 0 days.

(21) Appl. No.: 17/297,400

(22) PCT Filed: Dec. 12, 2019

(86) PCT No.: PCT/IB2019/060678
§ 371 (c)(1),
(2) Date: May 26, 2021

(87) PCT Pub. No.: WO2020/121227
PCT Pub. Date: Jun. 18, 2020

(65) Prior Publication Data
US 2022/0017192 A1    Jan. 20, 2022

Related U.S. Application Data

(60) Provisional application No. 62/778,121, filed on Dec. 11, 2018.

(51) Int. Cl.
*B63C 11/48* (2006.01)
*H04N 5/225* (2006.01)
*H04N 5/232* (2006.01)
*G03B 17/08* (2021.01)

(52) U.S. Cl.
CPC ........... *B63C 11/48* (2013.01); *H04N 5/2252* (2013.01); *H04N 5/23293* (2013.01); *G03B 17/08* (2013.01)

(58) Field of Classification Search
CPC ....... B63C 11/48; G03B 17/08; G03B 17/566; H04N 5/2252; H04N 5/23293
See application file for complete search history.

(56) References Cited

U.S. PATENT DOCUMENTS

| | | | | |
|---|---|---|---|---|
| 4,485,398 A * | 11/1984 | Chapin, Jr. | .......... | H04N 5/2254 348/81 |
| 4,771,299 A * | 9/1988 | Gell, Jr. | ................. | G03B 17/08 396/26 |
| 10,313,592 B1 * | 6/2019 | Burberry | ................ | F16M 11/18 |
| 2002/0172562 A1 | 11/2002 | Worman et al. | | |
| 2008/0087209 A1 * | 4/2008 | Yoshida | ................. | B63B 22/20 73/170.16 |
| 2012/0008928 A1 * | 1/2012 | Ghali | ..................... | G03B 17/08 396/27 |
| 2016/0320484 A1 * | 11/2016 | Lanham | ................... | B63G 8/38 |

(Continued)

FOREIGN PATENT DOCUMENTS

| | | |
|---|---|---|
| JP | 2017026350 A | 2/2017 |
| WO | 2005010316 A2 | 2/2005 |
| WO | 2020/121227 A1 | 6/2020 |

OTHER PUBLICATIONS

International Search Report and Written Opinion; PCT Application No. PCT/IB2019/060678; dated Jan. 22, 2020.

*Primary Examiner* — Amy R Hsu
(74) *Attorney, Agent, or Firm* — Polsinelli PC

(57) ABSTRACT

A buoyant camera device that is mechanically connectable to existing equipment to image underwater objects and underwater processes, and method of using the device to image the underwater objects and the underwater processes.

20 Claims, 4 Drawing Sheets

(56) References Cited

U.S. PATENT DOCUMENTS

| | | | |
|---|---|---|---|
| 2016/0370687 A1* | 12/2016 | Xu | H04N 7/185 |
| 2017/0285202 A1* | 10/2017 | Fyffe | G01V 1/3852 |
| 2018/0063429 A1* | 3/2018 | Enriquez | B63G 8/001 |
| 2018/0249133 A1* | 8/2018 | Thiel | H01M 50/238 |
| 2019/0315446 A1* | 10/2019 | Ito | B63G 8/16 |
| 2019/0353985 A1* | 11/2019 | Austin | A01K 97/125 |

* cited by examiner

BUOYANT CAMERA DEVICE AND METHOD

CROSS-REFERENCED TO RELATE APPLICATIONS

This application is a national stage application of International Application No. PCT/IB2019/060678, which was filed on Dec. 12, 2019, which claims benefit to U.S. Provisional Application No. 62/778,121, filed on Dec. 11, 2018, the entire contents of both are hereby incorporated herein by reference.

BACKGROUND

1. Field

The present inventive concept generally relates to underwater imaging systems, and more specifically to an underwater camera device having a variable degree of buoyancy, that is operable to support one or more accessories to enable imaging of the sea floor, and that is operable to be secured to existing equipment via inline mechanical attachment to the existing equipment.

2. Description of Related Art

Many industries require underwater surveillance to track underwater objects and underwater processes. Conventional tracking cameras require complex control systems. Such conventional tracking cameras require users to submerge the cameras into water via entirely separate and independent equipment, which increases risk of displacement of the cameras relative to the underwater objects and underwater processes. Indeed, such conventional tracking cameras require users to maintain stability of the cameras while ensuring the cameras are correctly positioned and correctly oriented to track the underwater objects and underwater processes. Further, such conventional tracking cameras are expensive to manufacture and difficult to implement.

Therefore, a need exists for a new underwater imaging system operable to securely position imaging equipment in an orientation that facilitates tracking of underwater objects and underwater processes, that ensures quality of underwater surveillance, that provides increased security of the cameras, that is inexpensive to manufacture, and that is easy to implement.

SUMMARY

The present inventive concept eliminates the aforementioned problems associated with conventional tracking cameras. The present inventive concept provides a device that is via mechanically connected to existing equipment, e.g., retrofitted to the existing equipment, has a variable degree of buoyancy, is operable to securely position imaging equipment in an orientation that facilitates tracking of underwater objects and/or underwater processes, and provides increased security of the imaging equipment. The device of the present inventive concept provides higher quality of underwater surveillance relative to conventional equipment, and protects marine environment and/or marine life forms by providing an ability to observe the marine environment prior to employing an underwater tool. The device of the present inventive concept is inexpensive to manufacture, is easy to implement, and easy to operate from a surface vessel.

The aforementioned may be achieved in an aspect of the present inventive concept by providing a buoyant camera device. The device may include a housing. The housing may have a top surface, a bottom surface, a plurality of sidewalls, and/or at least one accessory aperture configured to at least partially receive an accessory. The housing may include a reservoir within the housing operable to provide an adjustable degree of buoyancy to the device. The housing may include a first receiver secured to the top surface enabling in-line attachment of the device to a portion of another device. The housing may include a second receiver secured to the top surface enabling in-line attachment of the device to another portion of the another device. The first receiver and the second receiver enable retrofitting of the device to the another device.

The at least one accessory aperture may include three accessory apertures. Each of the three accessory apertures is operable to receive one of the accessory and other accessories. Each of the three accessory apertures may be operable to orient a face of the accessory in a downward-facing position. The accessory may be at least one camera, at least one light, and/or at least one laser scaler. The at least one camera may be a color camera. The at least one camera may be operable to capture high definition video and/or high resolution still imagery. The one or more accessories may be an acoustic monitoring device such as an echo sounder and/or an acoustic communication device. The one or more accessories may be a light communication device. The one or more accessories may be a power supply. The one or more accessories may be configured to operate autonomously. The one or more accessories may be operable to wirelessly communicate with a user of the one or more accessories. It is foreseen that numerous types of underwater wireless communications may be utilized by the present inventive concept including, but not limited to those disclosed in U.S. Patent Publication No. 2017/0328982 and U.S. Pat. No. 5,303,207, which are incorporated herein by reference in their entireties.

The bottom surface may include a bottom support plate operable to distribute a first load across the bottom surface of the housing. The top surface may include a top support plate operable to distribute a second load across the top surface of the housing. The housing may rigid. The bottom surface may be substantially flat.

The adjustable degree of buoyancy may be increased by removing weight and/or decreased by adding weight. The weight may be added and/or removed via securely attaching the weight to an in-line tether connected to the housing, e.g., the top surface of the housing and/or the bottom surface of the housing.

The housing may include a receiving aperture extending entirely through the top support plate, the bottom support plate, and/or the housing. The housing may include a support member extending entirely through the receiving aperture. The support member may include a first end and/or a second end. The first end may be exposed through the top surface of the top support plate. The first end may include a first connection point. The second end may be exposed through the bottom surface of the bottom support plate. The second end may be a second connection point.

The at least one accessory aperture may be configured to allow an accessory to image a surface below the buoyant camera device. The accessory may be accessible through the top surface of the housing. The another device may be a sediment sampler, a water sampler, a dumb weight, an environmental sensor, a driller, or other underwater tool. The portion of the another device may be a connector of the another device. The device may be operable to be secured to the another device without any additional connectors.

The aforementioned may be achieved in another aspect of the present inventive concept by providing a method of imaging an underwater tool and/or underwater process. The method may include providing a buoyant camera housing. The housing may include a plurality of accessory apertures and/or a plurality of receivers. The method may include mounting a first accessory in a first one of the plurality of accessory apertures. The method may include mounting a second accessory in a second one of the plurality of accessory apertures. The method may include retrofitting the buoyant camera housing to a tool and/or a tether. The retrofitting may be achieved by securing the tool to a first one of the plurality of receivers. The retrofitting may be achieved by securing the tether to a second one of the plurality of receivers.

The method may include activating the first accessory and the second accessory. The method may include moving the buoyant camera housing and the tool into an elevated or airborne position by retracting the tether. The method may include moving the buoyant camera housing and the tool into a lowered or submerged position by extending the tether. The method may include collecting images of an underwater environment using the first accessory and/or the second accessory. The method may include storing the images of the underwater environment using one of the first accessory and the second accessory. The method may include moving the buoyant camera housing and the tool into the elevated the airborne position by retracting the tether. The method may include moving the buoyant camera housing and the tool into a resting or docked position by extending the tether. The method may include transferring the images from the one of the first accessory and/or the second accessory to a display.

The method may include operating the tool. The collecting the images of the underwater environment may include imaging at least a portion of the tool while the tool is in operation. The method may include displaying, via the display, the images transferred from the first accessory and/or the second accessory.

The buoyant camera housing may include a top surface, a bottom surface, and/or a plurality of sidewalls. The buoyant camera housing may include a reservoir operable to provide an adjustable degree of buoyancy to the buoyant camera housing. The first one of the plurality of receivers may be secured to the bottom surface. The second one of the plurality of receivers may be secured to the top surface to enabling in-line attachment of the buoyant camera housing between the tool and the tether. The first accessory may be at least one camera, at least one laser scaler, at least one light, at least one acoustic monitoring device such as an echo sounder and/or an acoustic communication device, at least one light communication device, at least one power supply, and/or at least one acoustic modem. The second accessory may be at least one camera, at least one laser scaler, at least one light, at least one acoustic monitoring device such as an echo sounder and/or an acoustic communication device, at least one light communication device, at least one power supply, and/or at least one acoustic modem. Each of the first accessory and the second accessory may be accessible through a top surface of the buoyant camera housing. The first accessory may be a camera operable to image the underwater environment through a bottom surface of the buoyant camera housing. The tool may be a sediment sampler, a water sampler, a dumb weight, an environmental sensor, a driller, or other underwater tool.

Other advantages of the invention will become apparent from the following description taken in connection with the accompanying drawings, wherein is set forth by way of illustration and example an embodiment of the present invention.

BRIEF DESCRIPTION OF THE DRAWINGS

In order to describe the manner in which the advantages and features of the present inventive concept can be obtained, reference is made to embodiments thereof which are illustrated in the appended drawings. Understanding that these drawings depict only exemplary embodiments of the present inventive concept and are not, therefore, to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
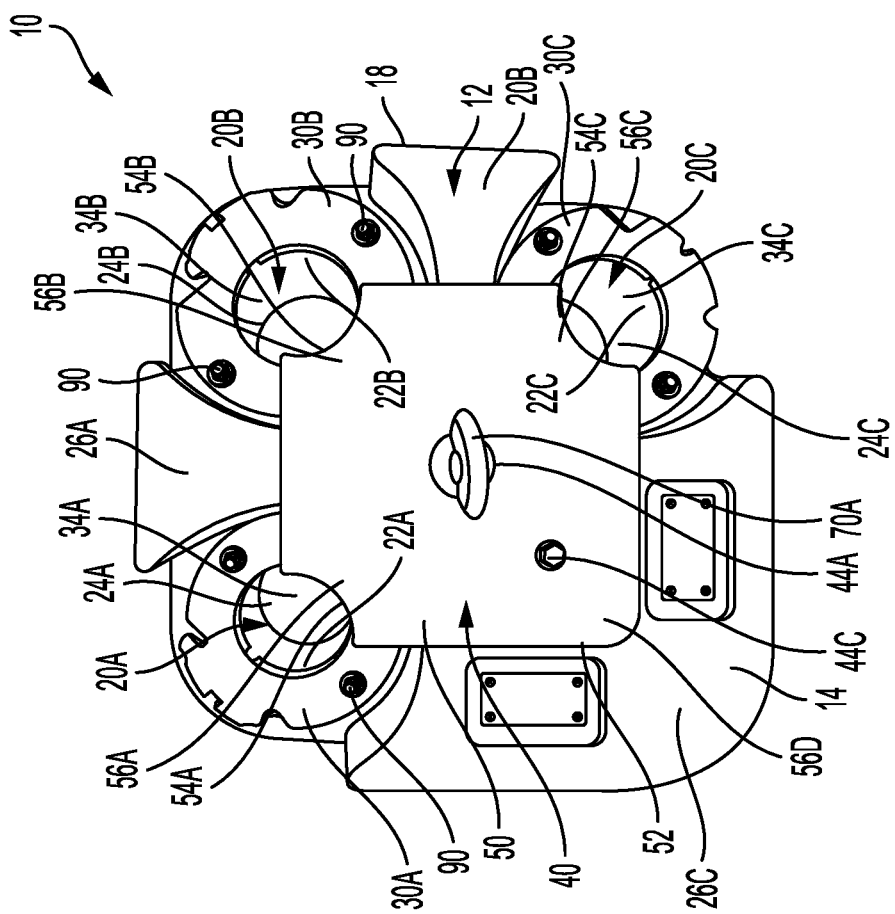
FIG. 1 is a top plan view of a top surface of a buoyant camera device according to an exemplary embodiment of the present inventive concept.
Figure 2:
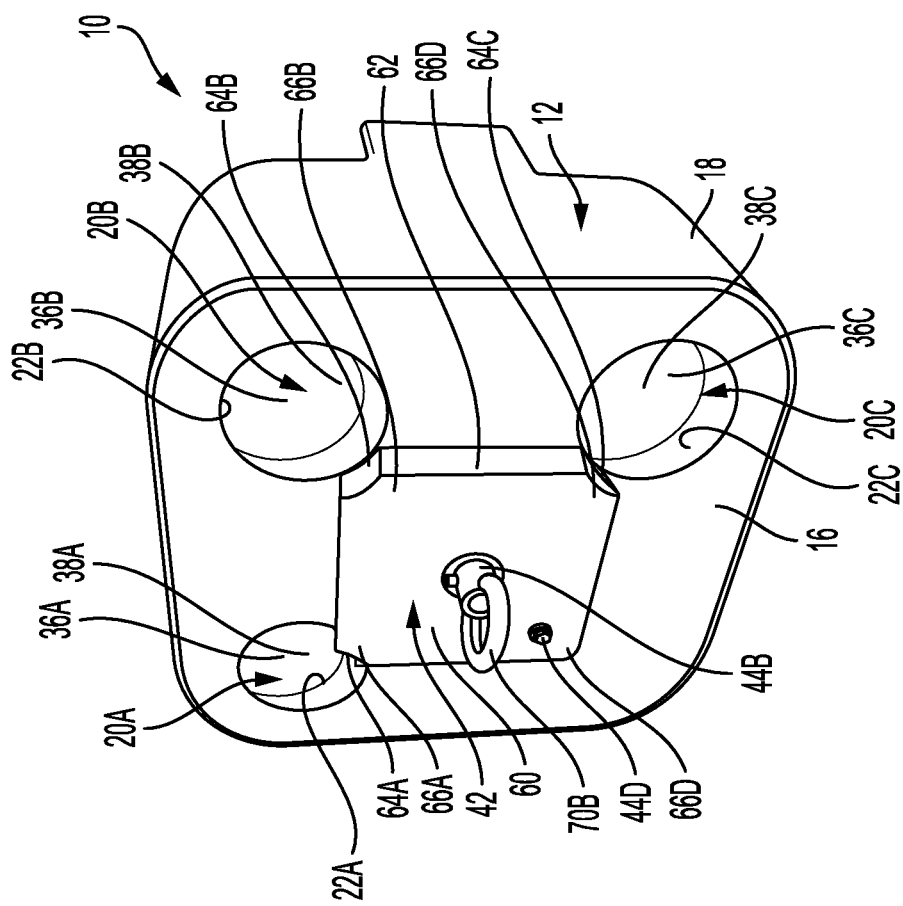
FIG. 2 is a bottom perspective view of a bottom surface of the buoyant camera device of FIG. 1.

Turning to FIGS. 1 and 2, a buoyant camera device 10 according to an exemplary embodiment of the present inventive concept is illustrated. The buoyant camera device can be retrofit to existing equipment. The device 10 includes a housing 12 having a top surface 14, a bottom surface 16, and a circumferential sidewall 18 with rounded or curved corners. The sidewall 18 extends between the top surface 14 and the bottom surface 16, and defines an outermost perimeter of the housing 12. In the exemplary embodiment, the housing 12 is rectangular shaped, with the top surface 14 and the bottom surface 16 being generally flat and extending parallel to each other. It is foreseen, however, that the housing 12 may be otherwise shaped, without deviating from the scope of the present inventive concept. For instance, the housing 12 may be sphere shaped, cube shaped, rectangular prism shaped, pyramid shaped, or cylinder shaped, without deviating from the scope of the present inventive concept.

The housing 12 is made of a light-weight, durable material operable for use with heavy equipment and in saltwater. In the exemplary embodiment, the housing 12 is made of plastic, but it is foreseen that other like material may be used, e.g., rubber, or combination thereof, without deviating from the scope of the present inventive concept. The material of the housing 12 is colored to provide a high contrast, thereby facilitating easy identification and tracking of the device 10 during use thereof, e.g., underwater. In the exemplary embodiment, the housing 12 is bright orange, but it is foreseen that the housing 12 may be otherwise colored, e.g., yellow, without deviating from the scope of the present inventive concept.

The device 10 includes three accessory apertures 20 A-C, which extend from the top surface 14 of the housing 12 and entirely through the housing 12 so that an elongated interior 22 A-C of each of the three accessory apertures 20 A-C is exposed from the top surface 14 and the bottom surface 16. It is foreseen that the device 10 may include only a single accessory aperture, only two accessory apertures, or more than three accessory apertures, without deviating from the scope of the present inventive concept. In the exemplary embodiment, the interiors 22 A-C are tubular or round, with a same diameter, but it is foreseen that the interiors 22 A-C may have different diameters and/or have different shapes, without deviating from the scope of the present inventive concept.

The top surface 14 includes a plurality of top openings 24 A-C, with each corresponding to one of the three accessory apertures 20 A-C, and providing access to a respective one of the interiors 22 A-C. Each of the plurality of top openings 24 A-C are recessed into the housing 12 and spaced from the top surface 14, with dividers 26 A-C of the housing 12 spacing each of the plurality of top openings 24 A-C from each other. In the exemplary embodiment, each of the plurality of top openings 24 A-C are round and have a diameter that is the same as the diameter of the interiors 22 A-C, but it is foreseen that the plurality of top openings 24 A-C may be otherwise shaped and/or have different diameters than each other and/or the interiors 22 A-C, without deviating from the scope of the present inventive concept. In the exemplary embodiment, the dividers 26 A-C are shaped with contoured walls around the plurality of top openings 24 A-C. It is foreseen, however, that the dividers 26 A-C may be otherwise shaped, without deviating from the scope of the present inventive concept. Each of the plurality of top openings 24 A-C includes one of a plurality of accessory mounting members 30 A-C secured to respective ones of the plurality of top openings 24 A-C and nested within the dividers 26 A-C. Each of the plurality of accessory mounting members 30 A-C is operable to secure an accessory 32 A-C within a respective one of the three accessory apertures 20 A-C as further discussed hereafter. Each of the plurality of accessory mounting members 30 A-C includes a window 34 A-C made of a transparent material operable to permit a user to view and/or otherwise interact with the accessory 32 A-C housed within the three accessory apertures 20 A-C, while protecting the accessory 32 A-C by preventing water and/or other foreign debris from entering the three accessory apertures 20 A-C. It is foreseen, however, that one or more of the window 34 A-C may be omitted from the device 10 and/or made of an opaque material, without deviating from the scope of the present inventive concept.

The bottom surface 16 includes a plurality of bottom openings 36 A-C, with each corresponding to one of the three accessory apertures 20 A-C, and providing access to a respective one of the interiors 22 A-C. In the exemplary embodiment, each of the plurality of bottom openings 34 A-C is round and extends planar to the bottom surface 16. In the exemplary embodiment, each of the plurality of bottom openings 36 A-C includes a diameter that is less than the diameter of the interiors 22 A-C. It is foreseen, however, that one or more of the plurality of bottom openings 36 A-C may be otherwise shaped and/or have different diameters than each other and/or the interiors 22 A-C, without deviating from the scope of the present inventive concept. Each of the plurality of bottom openings 36 A-C includes a window 38 A-C made of a transparent material operable to permit the accessory 32 A-C housed within the three accessory apertures 20 A-C to operate, while protecting the accessory 32 A-C by preventing water and/or other foreign debris from entering the three accessory apertures 20 A-C. It is foreseen, however, that one or more of the window 38 A-C may be omitted from the device 10 and/or made of an opaque material, without deviating from the scope of the present inventive concept.

The device 10 further includes a top support plate 40 and a bottom support plate 42 securely fastened to the top surface 14 and the bottom surface 16, respectively, via fasteners 44 A-D. The top support plate 40 and the bottom support plate 42 cooperate to increase structural integrity of the housing 12 of the device 10.

The top support plate 40 includes a top surface 50 opposite a bottom surface, and a perimeter edge 52. In the exemplary embodiment, the top support plate 40 is square shaped, but it is foreseen that the top support plate 40 may be otherwise shaped, e.g., circular or rectangular, without deviating from the scope of the present inventive concept. The top support plate 40 is operable to distribute a load across the top surface 14 of the housing 12. The top support plate 40 extends past the dividers 26 A-C and includes a plurality of cutouts 54 A-C, each defining a respective one of corners 56 A-C of the top support plate 40, with corner 56 D of the top support plate 40 not having any cutout. Each one of the plurality of cutouts 54 A-C have a circumference contoured to a respective one of the windows 34 A-C. In this manner, the plurality of cutouts 54 A-C prevent the top support plate 40 from obscuring the windows 34 A-C, thereby permitting the user to view and/or otherwise interact with the accessory 32 A-C housed within the three accessory apertures 20 A-C without requiring removal of the top support plate 40. In the exemplary embodiment, the circumference of each of the plurality of cutouts 54 A-C is the same, but it is foreseen that one or more of the plurality of cutouts 54 A-C may have different circumferences to each other, without deviating from the scope of the present inventive concept.

The bottom support plate 42 includes a bottom surface 60 opposite a top surface, and a perimeter edge 62. In the exemplary embodiment, the bottom support plate 42 is square shaped, but it is foreseen that the bottom support plate 42 may be otherwise shaped, e.g., circular or rectangular, without deviating from the scope of the present inventive concept. The bottom support plate 42 is operable to distribute a load across the bottom surface 16 of the housing 12. The bottom support plate 42 includes a plurality of cutouts 64 A-C, each defining a respective one of corners 66 A-C of the bottom support plate 42, with corner 66 D of the bottom support plate 42 not having any cutout. Each one of the plurality of cutouts 64 A-C having a circumference contoured to a respective one of the plurality of bottom openings 34 A-C. In this manner, the plurality of cutouts 64 A-C prevent the bottom support plate 42 from obscuring the plurality of bottom openings 34 A-C, thereby permitting the accessory 32 A-C housed within the three accessory apertures 20 A-C to operate without any interference by the bottom support plate 42. In the exemplary embodiment, the circumference of each of the plurality of cutouts 64 A-C is the same, but it is foreseen that one or more of the plurality of cutouts 64 A-C may have different circumferences to each other, without deviating from the scope of the present inventive concept.

The fasteners 44 A-D include primary fasteners 44 A-B, which extend between a center of the top support plate 40 and a center of the bottom support plate 42, and through the housing 12. The primary fasteners 44 A-B define a center mass of the device 10. The fasteners 44 A-D include secondary fasteners 44 C-D, which extend, respectively, from the corners 56 D and 66 D of the top support plate 40 and the bottom support plate 42, and only partially into the housing 12. The secondary fasteners 44 C-D cooperate with the primary fasteners 44 A-B to secure the top support plate 40 and the bottom support plate 42 together, and also prevent rotation of the top support plate 40 and/or the bottom support plate 42 relative to the housing 12. In the exemplary embodiment, the fasteners 44 A-D are bolts, but it is foreseen that one or more of the fasteners 44 A-D may be a screw or other fasteners without deviating from the scope of the present inventive concept. Each of the primary fasteners 44 A-B includes a receiver 70 A-B operable to securely attach the device 10 to another object.

Figure 3:
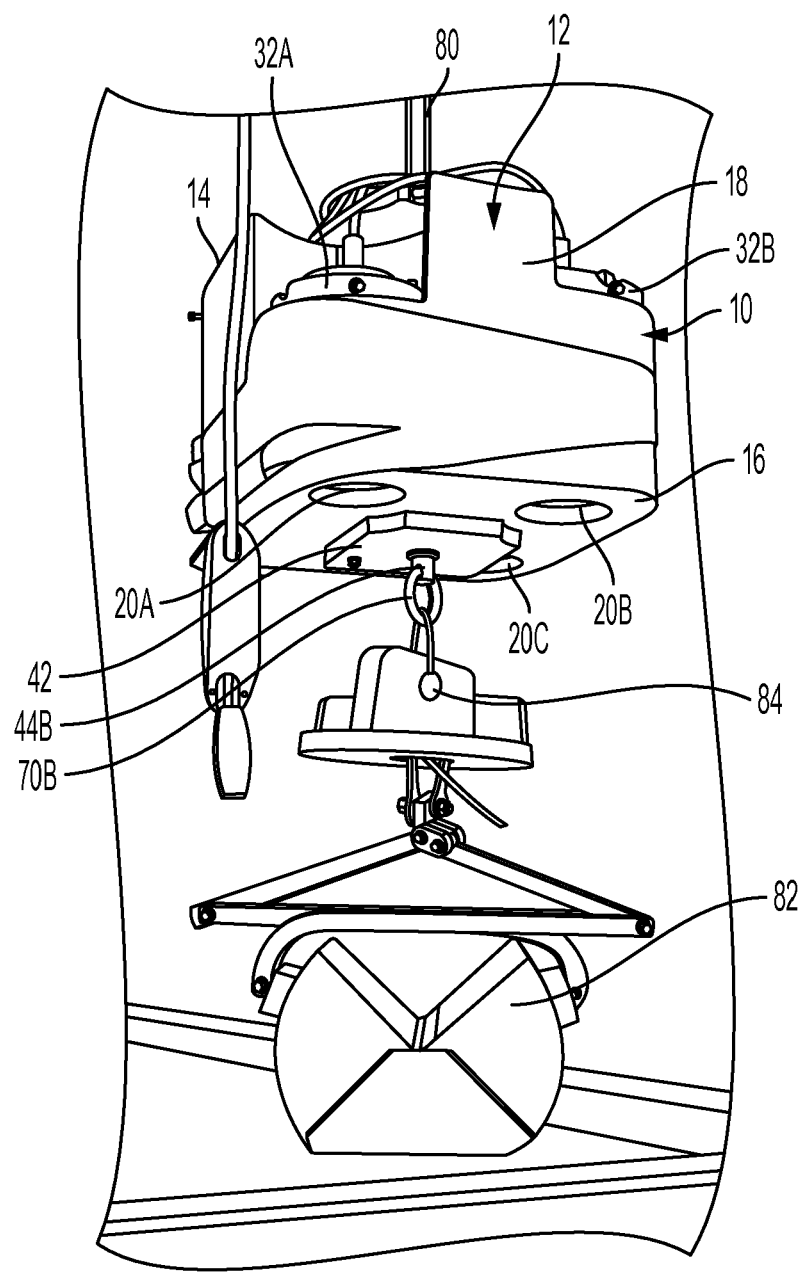
FIG. 3 is an image of the buoyant camera device according to an exemplary embodiment of the present inventive concept, with the device in use, secured to a tool, and elevated by a tether, with the tool being a sediment sampler in an open configuration.
Figure 4:
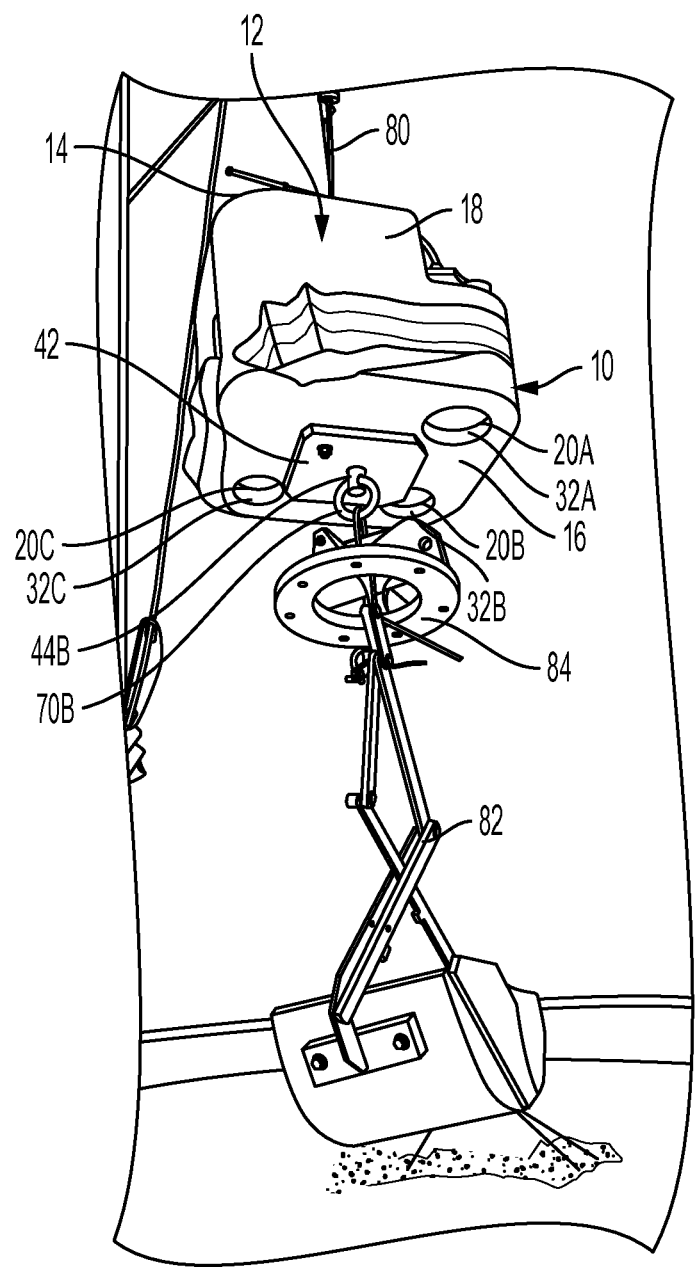
FIG. 4 is another image of the buoyant camera device of FIG. 3 in use, with the tool in a closed configuration.

Turning to FIGS. 3 and 4, a top receiver 70 A, is operable to securely receive a tether 80, thereby enabling a crane or other equipment to lift the device 10 from a resting or docked position to an airborne position. In the exemplary embodiment, the tether 80 is a cable, a rope, a chain, or other tethering equipment. A bottom receiver 70 B, is operable to secure a tool 82 to the device 10. The tool 82 includes an adapter 84 operable to connect to the bottom receiver 70B, thereby enabling the crane or other equipment to lift the device 10 and the tool 82 from the resting or docked position to the airborne position. In the exemplary embodiment, the adapter 84 extends from the tool 82 to enable the tool 82 to be directly secured to the crane or other equipment without the device 10, or indirectly secured to the crane or other equipment while suspended from the device 10. In this manner, the device 10 is operable to be retrofitted to the tool 82 via vertical, in-line attachment. As illustrated, the tool 82 is a sediment sampler. It is foreseen, however, that the tool 82 may be a water sampler, a dumb weight, an environmental sensor, a driller, or other underwater tool, without deviating from the scope of the present inventive concept.

In the exemplary embodiment, the accessories 32 A-C include a camera 32 A, a laser scaler 32 B, and a light 32 C. It is foreseen that the accessories 32 A-C may include at least one acoustic monitoring device such as an echo sounder and/or an acoustic communication device, at least one light communication device, at least one power supply, and/or at least one acoustic modem, without deviating from scope of the inventive concept. In the exemplary embodiment, the accessory aperture 20 A is operable to securely house the camera 32 A, the accessory aperture 20 B is operable to securely house the laser scaler 32 B, and the accessory aperture 20 C is operable to securely house the light 32 C. Although the interiors 22 A-C of each of the three accessory apertures 20 A-C are tubular or round, with the same diameter, in the exemplary embodiment as previously discussed, it is foreseen that the interiors 22 A-C may have a universal configuration for mounting a wide array of different accessories. Indeed, it is foreseen that the accessories 32 A-C may include one or more cameras, one or more laser scalers, one or more lights, and/or any other imaging equipment or combination therefor for tracking underwater objects and/or underwater processes, without deviating from the scope of the present inventive concept.

Each of the accessories 32 A-C are positioned in a downward orientation with a face of each of the accessories 32 A-C directed towards the tool 82 via each of the accessory apertures 20 A-C. In this manner, the device 10 facilitates imaging of the tool 82 while the tool 82 is suspended from the device 10 and interacts with a seafloor as further discussed hereafter.

The device 10 has an adjustable degree of buoyancy that allows the device 10 to remain afloat in various seawater density conditions. The degree of buoyancy is provided by the housing 12, which defines a hollow, internal reservoir filled with gas, thereby providing a predetermined buoyancy, which can be adjusted. The degree of buoyancy of the device 10 is operable to be adjusted by attaching and/or removing dumb weights to the device 10 and/or the tether 80. It is foreseen that the device 10 may include one or more weighted trim tabs attached to the device 10. The one or more trim tabs may be used to set a roll and/or a pitch angle of the device 10. In this manner, the bottom surface 16 of the device 10 can be set at a desired angle relative to the seafloor. For instance, in the exemplary embodiment, the trim tabs are used to ensure that the bottom surface 16 of the device 10 extends substantially parallel to the seafloor.

In use, the device 10 is provided in a docked or initial position, e.g., on a deck of a drilling rig, dock, or boat. Each of the plurality of accessories 32 A-C is installed into a respective one of the plurality of access apertures 20 A-C, with the accessory mounting members 30 A-C open to permit installation of each of the plurality of access apertures 20 A-C so the face of each of the plurality of access apertures 20 A-C extends into the plurality of access apertures 20 A-C and is directed toward the plurality of bottom openings 36 A-C. Once installed, each of the plurality of accessories 32 A-C is activated and the accessory mounting members 30 A-C are closed via a plurality of fasteners 90. In this manner, after activation, the accessories are operable to autonomously image, autonomously collect data, and/or autonomously track underwater objects, in the exemplary embodiment. It is foreseen, however, that one or more of the accessories of the device 10 may be controlled by a user, e.g., wirelessly or wired. It is also foreseen that numerous types of underwater wireless communications may be utilized by the present inventive concept including, but not limited to those disclosed in U.S. Patent Publication No. 2017/0328982 and U.S. Pat. No. 5,303,207, which are incorporated herein by reference in their entireties.

Next, the device 10 is retrofitted to the tether 80 and the tool 82 by securing the tether 80 to the top receiver 70 A and by securing the tool 82 to the bottom receiver 70 B. In this manner, the device 10 is operable to be used with the tool 82. Then, the device 10 is moved into the airborne position, as illustrated by FIG. 3, by retracting the tether 80 via the crane, and submerged by extending the tether 80. The tool 82 is used to perform its desired operation while images of the tool 82 as well as an underwater environment and/or the seafloor are collected using the plurality of accessories 32 A-C. The images are stored using a memory of one of the plurality of accessories 32 A-C, e.g., a memory of the camera 32 A. When the desired operation is completed by the tool 82, the crane removes the device 10 and the tool 82 from being submerged by retracting the tether 80, which returns the device 10 and the tool 82 to the airborne position, as illustrated by FIG. 4. The device 10 and the tool 82 are then moved to the initial position by extending the tether 80 via the crane. When the device 10 is in the initial position, the accessory mounting members 30 A-C are opened to permit access to the memory of the one of the plurality of accessories 32 A-C 32 A. Then, the images are transferred from the memory to a display, e.g., of a computer of an operator for review of the operation completed by the tool 82, the underwater environment and/or the seafloor.

In this manner, the device 10 of the present inventive concept is retrofittable to existing equipment, has a variable degree of buoyancy, is operable to securely position imaging equipment in an orientation that facilitates tracking of underwater objects and/or underwater processes, provides increased security of the imaging equipment, is inexpensive to manufacture, and is easy to implement.

While the present disclosure has been described with reference to various embodiments, it will be understood that these embodiments are illustrative and that the scope of the disclosure is not limited to them. Those skilled in the art will appreciate that variations from the specific embodiments disclosed above are contemplated by the invention. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A buoyant camera device comprising:
   a housing having a top surface, a bottom surface, a plurality of sidewalls, and at least one accessory aperture configured to at least partially receive an accessory in an interior volume of the housing;
   a reservoir within the housing operable to provide an adjustable degree of buoyancy to the device; and
   a first receiver secured to the top surface enabling in-line attachment of the device to a portion of another device,
   a second receiver secured to the top surface enabling in-line attachment of the device to another portion of the another device,
   wherein,
   the first receiver and the second receiver enable mechanical coupling of the device to the another device.

2. The device of claim 1,
   wherein,
   the at least one accessory aperture includes three accessory apertures,
   each of the three accessory apertures is operable to receive one of the accessory and other accessories,
   each of the three accessory apertures is operable to orient a face of the accessory in a downward-facing position.

3. The device of claim 1, wherein the adjustable degree of buoyancy is operable to be increased and decreased by adding or removing weight from an in-line tether connected to the bottom surface of the housing.

4. The device of claim 1, wherein the bottom surface includes a bottom support plate operable to distribute a first load across the bottom surface of the housing.

5. The device of claim 4, wherein the top surface includes a top support plate operable to distribute a second load across the top surface of the housing.

6. The device of claim 5, further comprising:
   a receiving aperture extending through the top support plate, the bottom support plate, and the housing, and
   a support member extending through the receiving aperture and having a first end and a second end, the first end (i) exposed through the top surface of the top support plate, and (ii) having a first connection point, the second end (i) exposed through the bottom surface of the bottom support plate, and (ii) having a second connection point.

7. The device of claim 1, wherein at least one accessory aperture is configured to position the accessory to image a surface below the buoyant camera device, and the accessory is accessible through the top surface of the housing.

8. The device of claim 1, wherein another device is a sediment sampler, a water sampler, a dumb weight, or an environmental sensor.

9. The device of claim 8, wherein the portion of the another device is a connector of the another device.

10. The device of claim 9, wherein the device is operable to be secured to the another device without any additional connectors.

11. A method of imaging an underwater tool and/or underwater process, the method comprising:
    providing a buoyant camera housing having a plurality of accessory apertures and a plurality of receivers;
    mounting a first accessory in a first one of the plurality of accessory apertures, wherein the first one of the plurality of accessory apertures at least partially receives the first accessory in an interior volume of the buoyant camera housing;
    mounting a second accessory in a second one of the plurality of accessory apertures;
    mechanically coupling the buoyant camera housing to a tool and a tether by (i) securing the tool to a first one of the plurality of receivers, and (ii) securing the tether to a second one of the plurality of receivers;
    activating the first accessory and the second accessory;
    moving the buoyant camera housing and the tool into a suspended position by retracting the tether;
    moving the buoyant camera housing and the tool into a submerged position by extending the tether; and
    collecting images of an underwater environment using the first accessory and the second accessory.

12. The method of claim 11, further comprising:
    storing the images of the underwater environment using one of the first accessory and the second accessory;
    moving the buoyant camera housing and the tool into the suspended position by retracting the tether;
    moving the buoyant camera housing and the tool into a docked position by extending the tether; and
    transferring the images from the one of the first accessory and the second accessory to a display.

13. The method of claim 12, further comprising:
    operating the tool,
    wherein the collecting the images of the underwater environment includes imaging at least a portion of the tool while the tool is in operation.

14. The method of claim 13, further comprising:
    displaying, via the display, the images transferred from the one of the first accessory and the second accessory.

15. The method of claim 11, wherein the buoyant camera housing includes:
    a top surface, a bottom surface, and a plurality of sidewalls; and
    a reservoir operable to provide an adjustable degree of buoyancy to the buoyant camera housing.

16. The method of claim 15, wherein the first one of the plurality of receivers is secured to the bottom surface and the second one of the plurality of receivers is secured to the top surface to enabling in-line attachment of the buoyant camera housing between the tool and the tether.

17. The method of claim 11, wherein each of the first accessory and the second accessory is accessible through a top surface of the buoyant camera housing.

18. The method of claim 11, wherein the first accessory is a camera operable to image the underwater environment through a bottom surface of the buoyant camera housing.

19. The method of claim 11, wherein the tool is a sediment sampler, a water sampler, a dumb weight, or an environmental sensor.

20. The method of claim 11, wherein the accessory is operable for autonomous operation.

* * * * *